United States Patent
Harrison Eyquem

(10) Patent No.: US 9,427,947 B2
(45) Date of Patent: Aug. 30, 2016

(54) METHOD TO APPLY RETRO-REFLECTIVE MATERIAL ON ELASTIC MATERIALS AND FABRICS

(76) Inventor: Felipe Luis Harrison Eyquem, Las Condes (CL)

( * ) Notice: Subject to any disclaimer, the term of this patent is extended or adjusted under 35 U.S.C. 154(b) by 454 days.

(21) Appl. No.: 13/807,988

(22) PCT Filed: Jul. 1, 2011

(86) PCT No.: PCT/IB2011/052924
§ 371 (c)(1),
(2), (4) Date: Apr. 24, 2013

(87) PCT Pub. No.: WO2012/001669
PCT Pub. Date: Jan. 5, 2012

(65) Prior Publication Data
US 2013/0199706 A1 Aug. 8, 2013

(30) Foreign Application Priority Data
Jul. 2, 2010 (CL) .................................... 714-2010

(51) Int. Cl.
| | |
|---|---|
| *B32B 38/00* | (2006.01) |
| *B32B 33/00* | (2006.01) |
| *B44F 1/02* | (2006.01) |
| *G02B 5/124* | (2006.01) |
| *D06Q 1/10* | (2006.01) |
| *B32B 37/14* | (2006.01) |

(52) U.S. Cl.
CPC ........... *B32B 38/0012* (2013.01); *B32B 33/00* (2013.01); *B32B 37/144* (2013.01); *B44F 1/02* (2013.01); *D06Q 1/10* (2013.01); *G02B 5/124* (2013.01); *B32B 2038/0028* (2013.01); *B32B 2305/18* (2013.01); *B32B 2307/416* (2013.01); *B32B 2307/51* (2013.01); *B32B 2309/02* (2013.01); *B32B 2309/04* (2013.01); *B32B 2309/12* (2013.01); *B32B 2309/14* (2013.01)

(58) Field of Classification Search
CPC .......... B32B 33/00; B32B 2038/0028; B32B 2305/18; B32B 2307/416; B32B 2307/51; B32B 2309/02; B32B 37/144; B32B 2309/12; B32B 2309/14; B32B 2309/04; B44F 1/02; G02B 5/124; D06Q 1/10
USPC ......................................... 156/163, 160, 229
See application file for complete search history.

(56) References Cited

U.S. PATENT DOCUMENTS

| 5,691,846 A | * | 11/1997 | Benson et al. ................ 359/530 |
| 2008/0145146 A1 | * | 6/2008 | Shipman et al. ............... 404/14 |

FOREIGN PATENT DOCUMENTS

| EP | 2 233 631 | 9/2010 |
| WO | WO 93/10985 | 10/1993 |
| WO | WO 97/41466 | 11/1997 |

OTHER PUBLICATIONS

International Search Report for International Application No. PCT/IB2011/052924 mailed Dec. 19, 2011.

* cited by examiner

*Primary Examiner* — Jacob T Minskey
*Assistant Examiner* — Vishal I Patel
(74) *Attorney, Agent, or Firm* — Merchant & Gould P.C.

(57) ABSTRACT

A method allowing retro-reflective material to be applied on elastic materials, bodies and fabrics by which it is possible to manufacture retro-reflective products that do not suffer from deterioration, cracking or breaking of the applied retro-reflective material when stretched, and that allows, at the same time, to fully retain the properties, color and shape of the elastic material or fabric upon which the procedure was conducted, that comprises the following steps: a) thermal application of retro-reflective material, which includes an amount of retro-reflective material that varies from 0.5 and 3.5 $cm^2$ per square centimeter of elastic material being treated, a temperature that varies between 110.0 and 215.0° C., a pressure that varies between 1.020 and 6.021 $Kg/cm^2$; this step must be performed while the elastic body is subjected to a stretching ranging between 5.0 and 50.0% of its total expansion potential, over a period of time that fluctuates between 4.0 and 45.0 seconds or, where appropriate, in a continuous manner, at a speed rate that varies between 0.01 and 4.00 m/s; and b) smoothing and fixing of the product, step which comprises applying a temperature that varies between 50.0 and 165.0° C., a pressure that varies between 0.0112 and 0.5602 $kg/cm^2$, during a period of time that fluctuates between 1.5 and 60 seconds or, where appropriate, at a speed rate which varies between 0.01 and 6.00 m/s, while performing a new stretching, which should vary between 0.2 and 40.0% of the product's total potential expansion.

16 Claims, No Drawings

METHOD TO APPLY RETRO-REFLECTIVE MATERIAL ON ELASTIC MATERIALS AND FABRICS

This application is a National Stage Application of PCT/IB2011/052924, filed 1 Jul. 2011, which claims benefit of Serial No. 714-2010, filed 2 Jul. 2010 in Chile and which applications are incorporated herein by reference. To the extent appropriate, a claim of priority is made to each of the above disclosed applications.

FIELD OF APPLICATION

The current invention relates to the adhesion of retro-reflective materials on elastic materials and, more particularly, with methods of application and thermal conditioning of retro-reflective materials on elastic materials and fabrics.

BACKGROUND

The thermal adhesion of retro-reflective materials on elastic materials and fabrics has several complexities and drawbacks, regarding the method with which the application is performed, as well as the results obtained once the process is completed. In fact, in the first place, one of the inconveniences to be noticed, is the cracking occurring in the retro-reflective material once it has been adhered to the elastic material or fabric after stretching it. Said cracking affects the retro-reflective efficiency of the product, its lifespan, and its end appearance in a substantial manner. At the same time, and notwithstanding the foregoing, properties and shape of the elastic material or fabric upon which the retro-reflective material is applied, result modified due to this process. Indeed, and considering the state of the art, the elastic material or fabric is deformed because of the application of the retro-reflective material (undulations), which also creates granules and creases which interfere with the uses the material was conceived for. According with the foregoing, it is possible to notice that the thermal application of retro-reflective material on elastic materials, bodies and fabrics is extremely complex, and its performance is currently inefficient.

Nowadays, the use of retro-reflective material becomes increasingly popular, due to the importance of visualizing and identifying properly the things surrounding us, which is especially relevant on the street, with regard to pedestrians, cyclists, runners, motorcyclists and street signals. In fact, retro-reflectiveness has the property of sending the received stream of light back to the light source, which is particularly useful to make persons and objects visible near zones of vehicular traffic where there might be a lack of light. Thus, those who wear retro-reflective clothes or elements can be easily noticed by drivers, allowing to ensure their safety and avoiding accidents due to lack of light on the streets, roads or highways.

This effect of sending the light back to its source, has attracted the interest in making sports and safety clothes, street signs, security devices, tags and stickers for objects and vehicles, among other uses.

So, the application of retro-reflective materials in clothes and fabrics in general, has been performed by use of the following methods:

i) Sticking it: accordingly, the retro-reflective material is adhered to the garment by means of an adhesive or gluing it.
ii) Sewing it: accordingly, the retro-reflective material is attached to the garment being sewed.
iii) Thermal-Fusing it: accordingly, the retro-reflective material is thermally-fused to the garment by means of a system that applies heat, requiring at the same time certain pressure for a certain period of time to cause them to fuse together In accordance to the foregoing, it has been created a method using thermal-fusion for the application of the retro-reflective material on the elastic material which, in the one hand, comprises a step that considers the amount of retro-reflective material to be applied in the elastic material or fabric, additionally, considering a certain temperature and pressure, a certain time or, when appropriate, speed of application, besides the default stretching of the elastic material or fabric while the application is being performed, and, in the other hand, comprises a step that considers a process thereafter for the smoothing and fixing of the product, additionally considering, in different terms, a certain range of temperatures, pressure and stretching, as well as a certain time or, when appropriate, speed; all this to be performed in a different way and at different values to those used in the first step of the application of the retro-reflective material, since in this second step, the retro-reflective material is already thermally adhered to the elastic material or fabric, forming a new and single product (fused together).

In consequence, currently existing drawbacks, present in the application of retro-reflective material by thermal means on elastic materials and fabrics, are completely solved by means of the aforementioned method, endeavoring the retro-reflective material, as well as the elastic material or fabric on which the retro-reflective material was applied, to keep all their properties, thus providing a final product with the highest quality and efficiency never achieved, having a superior qualitative difference to all known up to now.

The current invention relates to the thermal application of retro-reflective material (thermal-fusion), therefore, it comprises a different method to those aforementioned related to sticking and sewing methods. In fact, the thermal application requires the use of certain heat doses in the process, unlike the other two methods that use adhesive or sewing, respectively, to perform the fixing of the retro-reflective material on the elastic material, body or fabric. On the other hand, the result obtained with the thermal-fusion method is basically different to the one obtained with the other two (sticking or sewing), due to the fact that the retro-reflective material is fused with the elastic material, meaning that the two elements become only one (end product). On the contrary, in the system with the sticking as in the system with the sewing, the retro-reflective material is fixed to the surface of the elastic material of fabric, without the fusion of the two of them.

Over time, the application of retro-reflective materials by means of thermal processes (thermal-fusion) has been mostly limited to non-elastic materials, since the retro-reflective material cracks and opens when applied on an elastic material as it is stretched. In other words, the thermal systems used until now for the application of retro-reflective materials on elastic materials and fabrics, keep them from an efficient use of the final product, since the retro-reflective materials opens, breaks and cracks when the product is stretched. Hence, and due to these drawbacks, several inconveniences can be noticed: 1) retro-reflectiveness of the product decreases; 2) lifespan is reduced; 3) wash resistance decreases; 4) end appearance is affected; 5) efficient potential use decreases; 6) retro-reflective material losses its homogeneity; 7) the angular range of reflectivity decreases; among others.

However, the previous art has had an improvement that corresponds to a method in which it results possible to apply retro-reflective material on elastic materials and fabrics, without experiencing deterioration or cracking once the elastic material or fabric is stretched. Said method includes the determination of the temperature, pressure and time involved in the application of the retro-reflective material, as well as the necessary stretching of the material while the process is being performed. This method is disclosed in the Chilean Patent Application N° CL 2309/2004, containing a method aiming to the application of the retro-reflective material on elastic materials, tapes and fabrics, avoiding the breaking and cracking of the material fixed on said elastic material, tape, or fabric when it is stretched, characterized because the method comprises the thermal application of the retro-reflective material on the elastic material, tape or fabric, by means of an adhesive film containing thermal sensitive adhesive, using a temperature that may vary between 130 and 185° C., applying a pressure during the application between 2.039 and 5.099 Kg/cm², and during a period of time between 7.0 and 25.0 seconds; meanwhile, the stretching applied to said elastic material, tape or fabric, during the application of the retro-reflective material, fluctuates between 8.0 and 20.0% of the total expansion potential of the elastic material.

Nonetheless, the aforementioned method has deficiencies due to several reasons: on the first place, it deforms the elastic material or fabric on which the retro-reflective material was applied. In second place, it generates granules and creases on the material. Third, it does not allow a uniform application of the retro-reflective material.

Forth, it generates a change in the color of the retro-reflective material. Fifth, it affects the efficiency of the lifespan of the final product since, increasing the amount of retro-reflective material applied (and by this means, aiming to increase the product's lifespan), causes the elastic materials and fabrics to strain even more than before.

In other words, taking any configuration known in the state of the art, so far, there is no method allowing an efficient application of retro-reflective material on elastic materials and fabrics without affecting the involved materials in a negative manner. With this regard, as mentioned before, the method of the cited patent application is not fully efficient since, even though when stretching the final product the retro-reflective material suffers less cracking, the elastic material upon which this retro-reflective material is applied, experiences a greater deformation, becoming non usable for the use it was conceived for. This deformation manifests itself mostly as undulations, curves or waves in the elastic material, avoiding certain garments to be used comfortably and satisfactorily, for example: shirts, jackets or trousers; all articles that require materials that can keep the original design, which the aforementioned patent cannot fulfill since garments finally get, as said, deformed. In the same way, that patent's disclosed invention generates, at the same time, granules and creases on the product, as well as a change in the color of the retro-reflective material, all these representing a problem referring to the final product's lifespan and its end appearance.

In view of the above, the manufacturing of elastic retro-reflective material has been scarce given the difficulties found in making it and getting efficient results.

However, the potential of having such method that allows the creation of elastic/retro-reflective products appears relevant. Indeed, and specially in the field of security and sports clothes: the possibility to have such garments and objects available; to offer proper visualization of pedestrians in poor light conditions: and offer products that are able to adapt to the user's body and movements; appears crucial.

In the same way, to solve the problem of the thermal adherence of the retro-reflective material on elastic materials, bodies and fabrics, as well as broadening its industrial field of application, improving its durability, enlarging the uses given to this kind of products, and improving the deformation of the materials and fabrics due to said application, it has been conceived a method which is technically capable of thermally adhering both elements, solving the problems listed above.

All this provided, the contribution of the current method in this application is substantial, since, regarding all known in the state of the art, it is the only one that gets to ensure an efficient result in terms of applying the retro-reflective material on elastic materials and fabrics, keeping all the retro-reflective material properties unaffected, even when subjected to multidirectional stretching; and, also, keeping the original form and shape of the treated elastic material (there is no deformation), thus, creating a final product that gives the user security, comfort and a perfect end appearance, solving, consequently, all mentioned drawbacks.

Additionally, the method: does not generate granules nor creases in the final product; improves its durability; optimizes the retro-reflective capability; improves its resistance to washing; improves its end appearance; improves the efficiency when used; and, finally, enlarges the range of retro-reflective elements, garments, articles and devices that can be manufactured in accordance with it.

In this way, the current application consists in a comprehensive method for the application of retro-reflective material on elastic materials, bodies and fabrics (polyester, elastan, nylon tapes, spandex, and other similar materials), that comprises a first step in which said elements are subject to a thermal-fusion process according to a procedure and a range of predetermined values, and, at the same time, a second step comprising a process of smoothing and fixing of the product, which is performed in a different manner, and with different values, to those used in the preceding step.

In this way, the method object of the present invention comprises two steps, with which the fusing of retro-reflective material on elastic materials and fabrics can achieve optimal results in terms of application, end appearance, and efficiency; and where the integration of both steps, in accordance with the variables here specified, is fundamental in order to reach those results.

Ultimately, it has been conceived a method with which it is possible to apply retro-reflective material on elastic materials, bodies and fabrics (e.g.: polyester, elastan, nylon and spandex, among others), allowing this material, once treated, to be subjected to multiple stretching without suffering any damage; ensuring a homogeneous and uniform application of the material, hence avoiding granules, creases and change in color of the same; achieving an improved dosage of the amount of retro-reflective material to be used on the elastic material or fabric; and, that allows the treated elastic material, body or fabric, not to be subjected to deformations, keeping its characteristics, its shape and end appearance. In accordance with the latter, the method object of this patent application can be used in the manufacture of garments and objects such as: trousers, jackets, shirts and t-shirts, bracelets, wristbands, waistcoats, harnesses, gloves, ropes, shoes, threads, fibers, and street signs, among others.

DETAILED DESCRIPTION OF THE INVENTION

All previously exposed results are possible through the method object of this application, which allows applying the thermal-transferable retro-reflective material on elastic materials, bodies and fabrics. This method comprises the following steps:
  a) thermal application of retro-reflective material, in which the retro-reflective material fuses with the elastic material, body or fabric upon which it is being applied, which includes an amount of retro-reflective material that varies from 0.5 and 3.5 cm² per square centimeter of elastic material, this step must be performed while the elastic material or fabric is subjected to a stretching ranging between 5.0 and 50.0% of its total expansion potential, at a temperature that varies between 110.0 and 215.0° C., and at a pressure that varies between 1.020 and 6.021 Kg/cm²; and
  b) smoothing and fixing of the product, step which comprises applying a temperature that varies between 50.0 and 165.0° C., a pressure that varies between 0.0112 and 0.5602 kg/cm², while performing a new stretching, which should vary between 0.2 and 40.0% of the product's total expansion potential.

In a preferred configuration of the invention, the step of thermal application of the retro-reflective material is conducted by a pressing process, where the period of time of the thermal application varies from 4.0 to 45.0 seconds, and preferably is in the range from 10.0 to 20.0 seconds.

Besides, in another configuration of the present invention, said step of application of the retro-reflective material can be performed in a continuous manner, using rollers, where the speed range varies between 0.01 and 4.00 m/s, with a preferred range between 0.03 and 0.07 m/s.

Thus, and considering that the retro-reflective material being used for this method needs heat to adhere to the elastic material or fabric, the thermal application in step (a) has to be performed at a temperature range between 160 and 170° C., where the pressure to be applied on the retro-reflective material preferably varies between 2.401 and 3.515 Kg/cm2.

At the same time, step (a) has to be performed while the elastic material is subjected to a stretching that preferably varies between 10.0 and 20.0% of the material's total expansion potential.

Additionally, and in accordance to the previously mentioned in this application, the method comprises the determination of the amount of retro-reflective material to be applied in step (a), which varies between 0.8 and 1.2 cm² of retro-reflective material per square centimeter of elastic material.

Once the retro-reflective material has been applied, step (b) of this method is performed, in which the product is subjected to a process of smoothing and fixing, that comprises a temperature of application that varies between 70 and 80° C. At the same time, the preferred pressure to be applied on the product varies between 0.1008 and 0.1210 Kg/cm2; all this has to be performed while the product is subjected to a stretching that preferably fluctuates in the range from 1.0 to 3.0% of its total expansion potential.

Similar to the first step, a preferred configuration of the complete current invention comprises the use of a pressing process for step (b), in which the period of time for the pressing goes from 1.5 to 60.0 seconds, and preferably between 3.0 to 15.0 seconds. In an alternative manner, the present invention comprises a continuous process by using rollers for step (b), where the speed range varies between 0.01 and 6.00 m/s, with a preferred range between 0.01 and 0.04 m/s.

EXAMPLE

A test of thermal application of retro-reflective material was performed in accordance with the current invention, in which for step (a) was used an amount of 1.0 cm² of retro-reflective material per square centimeter of elastic material, a temperature of 165° C. and a pressure of 3.023 Kg/cm² were applied, during a period of time of 13.0 seconds, which was conducted while the elastic material was subjected to a stretching of 15.0% of its total expansion potential.

Afterwards, step (b) was performed (corresponding to the smoothing and fixing of the product), in which several values for temperature, pressure, time, speed and stretching were applied, according to the samples in the following table.

TABLE N° 1

| Sample | Temperature (Celsius) | Pressing time (sec.) | Speed (m/s) | Pressure (Kg/cm2) | Stretching (%) |
|---|---|---|---|---|---|
| 1 | 50° | 60.0 sec. | — | 0.0112 | 5.0% |
| 3 | 50° | — | 0.01 m/s | 0.0112 | 4.0% |
| 4 | 60° | 50.0 sec. | — | 0.2240 | 5.0% |
| 5 | 65° | — | 0.08 m/s | 0.1008 | 2.0% |
| 6 | 70° | 30.0 sec. | — | 0.5602 | 1.0% |
| 7 | 70° | 10.0 sec. | — | 0.1210 | 2.0% |
| 8 | 70° | — | 0.05 m/s | 0.0112 | 25.0% |
| 9 | 70° | 3.0 sec. | — | 0.0112 | 3.0% |
| 10 | 75° | — | 0.02 m/s | 0.0112 | 40.0% |
| 11 | 70° | — | 0.02 m/s | 0.1008 | 3.0% |
| 12 | 75° | 3.5 sec. | — | 0.1008 | 10.0% |
| 13 | 75° | — | 0.02 m/s | 0.1008 | 1.5% |
| 14 | 80° | 1.5 sec. | — | 0.0112 | 0.2% |
| 15 | 80° | — | 0.03 m/s | 0.1008 | 1.0% |
| 16 | 85° | — | 0.09 m/s | 0.1210 | 8.0% |
| 17 | 85° | 2.0 sec. | — | 0.1008 | 20.0% |
| 18 | 95° | — | 0.30 m/s | 0.0112 | 10.0% |
| 19 | 110° | — | 0.70 m/s | 0.1210 | 25.0% |
| 20 | 120° | — | 1.50 m/s | 0.1210 | 15.0% |
| 21 | 120° | 1.5 sec. | — | 0.1008 | 5.0% |
| 22 | 130° | — | 2.30 m/s | 0.1200 | 40.0% |
| 23 | 140° | — | 3.50 m/s | 0.1200 | 7.0% |
| 24 | 150° | 1.5 sec. | — | 0.1210 | 1.5% |
| 25 | 150° | — | 4.50 m/s | 0.5602 | 10.0% |
| 26 | 150° | — | 4.50 m/s | 0.2240 | 25.0% |
| 27 | 155° | 1.5 sec. | — | 0.1008 | 40.0% |
| 28 | 155° | — | 5.50 m/s | 0.1200 | 0.2% |
| 29 | 165° | — | 6.00 m/s | 0.5602 | 2.0% |

The following table shows some of the best results obtained. It was taken into consideration, among others, the preservation of the properties of the materials that were used, the quality of the product's end appearance, and its retro-reflective performance.

TABLE N° 2

| Sample 9 | Sample 11 | Sample 15 |
|---|---|---|
| Temperature: 70° C. | Temperature: 70° C. | Temperature: 80° C. |
| Time: 3.0 sec. | Speed: 0.02 m/s | Speed: 0.03 m/s |
| Pressure: 0.0112 Kg/cm² | Pressure: 0.1008 Kg/cm² | Pressure: 0.1008 Kg/cm² |
| Stretching: 3.0% | Stretching: 3.0% | Stretching: 1.0% |

In the same way, through different tests performed, it was possible to come to the following conclusions:
  1—The second step of the process (smoothing and fixing) is essential in order to get a properly finished product.
  2—In the same sense, this second step allows to correct any deformation caused by the application of the retro-reflective material (undulations, curves), achieving the preservation of its original shape.
  3—Better results were obtained conducting the second step at temperatures near 75° C., this can be explained since materials such as nylon, polyester or elastan, tend to shrink at higher temperatures. In this way, considering that the majority of the clothes are made with some of these materials, said temperature yields optimal results.

4—The method allows to obtain a high quality and endurable product, that keeps all the elastic and retro-reflective properties of both materials, being even possible to subject it to heavy duty processes of ironing above 35.0 seconds at a temperature of 70° C., and putting a pressure of 0.1010 Kg/cm².

Therefore, and in accordance with the state of the art, there is no previous method that allows the manufacture of retro-reflective products with similar features, advantages, end appearance, quality and efficiency, as offered by the method here described through this application, improving substantially all known in this field, so far.

I claim:

1. A method to apply retro-reflective material on elastic materials and fabrics, by which it is possible to manufacture retro-reflective products that do not suffer from deterioration, cracking or breaking of the applied retro-reflective material when stretched, and that allows, at the same time, to fully retain the properties, color and shape of the elastic material or fabric upon which the procedure was conducted, which comprises the following steps:
   a) stretching the elastic material to between 5.0 and 50.0% of the elastic material's total expansion potential while thermally applying the retro-reflective material at a temperature of 110.0 to 215.0° C., and a pressure of 1.020 to 6.021 kg/cm², such that the retro-reflective material fuses with the elastic material upon which it is being applied, and wherein the amount of retro-reflective material applied is 0.5 to 3.5 cm² per square centimeter of elastic material; and
   b) newly stretching the product of step (a) to between 0.2 and 40.0% of the product's total expansion potential for smoothing and fixing of the product, at a temperature of 50.0 to 165.0° C., and a pressure of 0.0112 to 0.5602 kg/cm².

2. The method according to claim 1, in which at step (a) the elastic material is subjected to a stretching of 10.0 to 20.0% of the material's total expansion potential.

3. The method according to claim 1, in which at step (a) the retro-reflective material is applied by a pressing process, where the period of time of the thermal application is 4.0 to 45.0 seconds.

4. The method according to claim 3, in which the period of time of the thermal application is 10.0 to 20.0 seconds.

5. The method according to claim 1, in which step (a) is performed by a continuous process, using rollers, where the speed rate is 0.01 to 4.00 m/s.

6. The method according to claim 5, in which the speed rate is 0.03 to 0.07 m/s.

7. The method according to claim 1, in which at step (a) the amount of applied retro-reflective material is 0.8 to 1.2 cm² of retro-reflective material per square centimeter of elastic material.

8. The method according to claim 1, in which at step (a) the temperature of application is 160 to 170° C.

9. The method according to claim 1, in which at step (a) the pressure is 2.401 to 3.515 Kg/cm².

10. The method according to claim 1, in which at step (b) the temperature of application is 70 to 80° C.

11. The method according to claim 1, in which at step (b) the pressure applied is 0.1008 to 0.1210 Kg/cm².

12. The method according to claim 1, in which stage (b) is performed by using a pressing process, where the period of time for the pressing is 1.5 to 60 seconds.

13. The method according to claim 12, in which the period of time for the pressing is 3.0 to 15.0 seconds.

14. The method according to claim 1, in which stage (b) is performed by a continuous process, using rollers, where the speed rate is 0.01 to 6.00 m/s.

15. The method according to claim 13, in which the speed rate is 0.01 to 0.04 m/s.

16. The method according to claim 1, in which at step (b) the product is subjected to a stretching that is 1.0 to 3.0% of its total expansion potential.

* * * * *